(12) United States Patent
Smith et al.

(10) Patent No.: US 9,533,718 B2
(45) Date of Patent: Jan. 3, 2017

(54) CONTINOUSLY ADAPTIVE FASTENER CLIP

(71) Applicant: Termax Corporation, Lake Zurich, IL (US)

(72) Inventors: Michael Walter Smith, Palatine, IL (US); Daniel James Dickinson, Lincolnshire, IL (US); Michael Tirrell, Volo, IL (US); Mark Fleydervish, Buffalo Grove, IL (US); Shawn Willis, White Lake, MI (US)

(73) Assignee: TERMAX CORPORATION, Lake Zurich, IL (US)

( * ) Notice: Subject to any disclaimer, the term of this patent is extended or adjusted under 35 U.S.C. 154(b) by 0 days.

(21) Appl. No.: 14/697,612

(22) Filed: Apr. 27, 2015

(65) Prior Publication Data

US 2016/0016522 A1    Jan. 21, 2016

Related U.S. Application Data (63) Continuation-in-part of application No. 12/534,119, filed on Aug. 1, 2009, which is a continuation-in-part
(Continued)

(51) Int. Cl.
| | |
|---|---|
| *B60R 13/02* | (2006.01) |
| *B62D 27/02* | (2006.01) |
| *F16B 2/22* | (2006.01) |
| *B60R 13/04* | (2006.01) |
| *F16B 21/07* | (2006.01) |

(Continued)

(52) U.S. Cl.
CPC ........... *B62D 27/02* (2013.01); *B60R 13/0206* (2013.01); *B60R 13/0212* (2013.01); *B60R 13/04* (2013.01); *F16B 2/22* (2013.01); *F16B 21/075* (2013.01); *F16B 37/043* (2013.01); *F16B 5/02* (2013.01);
(Continued)

(58) Field of Classification Search
CPC .. B60R 13/0212; B60R 13/02; B60R 13/0206; F16B 21/075; F16B 5/02; F16B 2/22; F16B 37/043; Y10T 24/44026; Y10T 24/304; Y10T 24/306; Y10T 24/307; B62D 27/02; B62D 13/04

See application file for complete search history.

(56) References Cited

U.S. PATENT DOCUMENTS

4,630,338 A * 12/1986 Osterland ............... F16B 5/123
                                                                24/293
5,263,233 A * 11/1993 Kim ....................... B05C 19/002
                                                                24/289
(Continued)

*Primary Examiner* — Robert J Sandy
*Assistant Examiner* — Michael Lee (57) ABSTRACT

A fastener clip includes a base plate and a first and second pair of laterally offset legs extending from the base plate. At least one first wing extends from the first pair of laterally offset legs. The at least one first wing has an engagement region. At least one second wing extends from the second pair of laterally offset legs. The at least one second wing also has an engagement region. A first joined portion extends from the first pair of legs and a second joined portion extends from the second pair of legs with the first joined portion and the second joined portion extending and overlapping over and under each other. First locking tabs extend sideways from the first joined portion folded over against the overlapping second portion, and second locking tabs extend sideways from the second joined portion folded over against the overlapping first portion.

21 Claims, 7 Drawing Sheets

Related U.S. Application Data of application No. 11/870,412, filed on Oct. 10, 2007, now Pat. No. 8,950,042, which is a continuation-in-part of application No. 11/277,107, filed on Mar. 21, 2006, now Pat. No. 8,627,552, which is a continuation-in-part of application No. 10/906,209, filed on Feb. 9, 2005, now Pat. No. 7,178,850.

(51) Int. Cl.
*F16B 37/04* (2006.01)
*F16B 5/02* (2006.01)

(52) U.S. Cl.
CPC ............. *Y10T 24/304* (2015.01); *Y10T 24/306* (2015.01); *Y10T 24/44026* (2015.01)

(56) References Cited

U.S. PATENT DOCUMENTS

| | | | | |
|---|---|---|---|---|
| 6,629,809 | B2* | 10/2003 | Vassiliou | F16B 37/041 411/173 |
| 6,644,713 | B2* | 11/2003 | Del Pozo Abejon | B60N 3/026 296/146.7 |
| 6,976,292 | B2* | 12/2005 | MacPherson | B60N 3/026 24/292 |
| 2005/0117993 | A1* | 6/2005 | Vassiliou | F16B 37/02 411/173 |
| 2008/0086850 | A1* | 4/2008 | Smith | B60R 13/0206 24/289 |
| 2008/0289155 | A1* | 11/2008 | Kim | B60J 3/0213 24/295 |
| 2016/0144801 | A1* | 5/2016 | Huelke | B60N 3/026 24/295 |

\* cited by examiner

CONTINOUSLY ADAPTIVE FASTENER CLIP

A. RELATED APPLICATIONS

This is a continuation in part application claiming priority from an application entitled "CONTINUOUSLY ADAPTIVE FASTENER CLIP" having a Ser. No. 12/534,119, having a filing date of Aug. 1, 2009, which is a continuation in part of an application entitled "CONTINUOUSLY ADAPTIVE FASTENER CLIP" having a Ser. No. 11/870,412, having a filing date of Oct. 10, 2007, which is a continuation in part of an application entitled "Multicontact Adaptive Fastener Clip" having a Ser. No. 11/277,107, having a filing date of Mar. 21, 2006, which is a continuation in part of U.S. patent application Ser. No. 10/906,209 filed on Feb. 9, 2005.

The above-referenced patents and/or patent applications are hereby incorporated by reference herein in their entirety.

A. BACKGROUND

The invention relates generally to devices for fastening objects, and more particularly to a fastener clip for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, headliner, or any interior trim piece. Additionally, the panel may be any suitable exterior body panel, such as a fender, bumper, quarter panel, or door panel. The chassis of the vehicle may include any substrate, plate, body panel, structural framework, chassis component or subcomponent, wall, or any suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, conventional fasteners typically do not adequately secure the panel to the vehicle chassis having sheet metal with different curvature or thicknesses throughout. In addition, conventional fasteners are not suitable under a variety of environmental conditions, such as in the presence of vibration at various levels of amplitude and frequency. For example, the fastener device should prevent or minimize the amount of buzzing, rattling, or any other type of noise that may cause attention to the occupants of the vehicle or otherwise weaken the attachment. In addition, conventional fasteners do not adequately accommodate various levels of production tolerances, such as various dimensions amongst, for example, the body panels as well as the vehicle chassis. Thus, conventional fastener devices typically do not adequately fasten to a range of sheet metal thicknesses and do not minimize or eliminate buzzing and rattling and do not sufficiently accommodate variations in production tolerances.

Fastener clips, such as metal spring fasteners, are known for attaching body panels to an automobile chassis. For example, fastener clips are known having a base plate and four stepped arms extending from the base plate. Each stepped arm includes four incremental steps (stair-steps) suitable for engaging a slot in a vehicle chassis with one of the steps on each arm. The incremental steps allow for engagement, however, in only one of the four discrete step positions rather than over a continuous range of engagement positions. Further, each step has a relatively large rise and run so that, once inserted, movement of the fastener clip within the range of a step size may occur, resulting in wear and/or the generation of noise, including buzzing and rattling as a result of vibrations occurring within the vehicle. In addition, the steps typically cut onto each arm during manufacture and require twisting of each wing on the fastener clip in order to engage the slot in the vehicle chassis. As a result, only an edge or a portion of an edge of each of the steps engages the hole in the vehicle slot.

If the sheet metal varies in thickness or if tolerances in production of the slot in the vehicle chassis or in the trim-piece exist, for example, then engagement of one portion of the hole in the chassis with one of the arms may not provide suitable frictional engagement or otherwise result in movement. Further, less than all four of the arms will make engagement with the slot of the vehicle chassis. Twisting of the body panel will be likely more prevalent because less than four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

B. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

A fastener clip includes a base plate and a first and second pair of laterally offset legs extending from the base plate. At least one first wing extends from the first pair of laterally offset legs. The at least one first wing has an engagement region. At least one second wing extends from the second pair of laterally offset legs. The at least one second wing also has an engagement region. The engagement regions include a depressed portion operable to adapt to variations or movement of a slot.

Among other advantages, the fastener clip has a high level of extraction force yet securely and relatively easily facilitates attachment of a body panel, such as an interior or exterior body panel with the first engagement structure such as the vehicle chassis. The fastener clip is suitable for use in heavy-duty applications such as visor mounting, headliners, and pull-handle fasteners. The wings have an engagement region, size, such as a width, length, thickness, and pivot point to provide very high extraction force levels while the insertion force level is relatively low.

Further, the same fastener clip may be used with different sheet metal thicknesses and curvatures. For example, a vehicle may have different sheet metal thicknesses at various parts of the vehicle. The range of slot thicknesses varies continuously from a minimum thickness to a maximum thickness. For example, the minimum thickness may be 0.25 mm or less and the maximum thickness may be 6.0 mm or more. The fastener clip is operative for insertion into the slot defined in a first engagement structure, such as a vehicle chassis. Since the fastener clip adapts automatically to different sheet metal thicknesses and curvatures, the same fastener clip may be used throughout the vehicle thus eliminating the need for specific fastener clips for specific slot thicknesses.

The engagement portion, along with an optional engagement tab on each wing, permits relatively easy insertion of the fastener clip into a slot formed within the vehicle chassis while providing a relatively high level of extraction force from the vehicle chassis. Assembly of the body panel onto the vehicle chassis requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome. By eliminating conventional screws for fastening to the roof, assembly of the visor and headliner to the roof with the fastener significantly reduces assembly and servicing time and cost. Further, by eliminating multiple fasteners for different sheet metal thicknesses, confusion during assembly is eliminated/reduced since the same type fastener may be used for all slots. Thus, an assembly worker need not worry about selecting the wrong fastener for different slot thicknesses.

The relatively high level of extraction force, characteristic of the fastener clip, securely attaches the body panel, such as an interior trim piece or headliner, to the vehicle chassis such as a roof. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals or metal to plastic with respect to the vehicle chassis components and/or between plastic components such as the interior trim panels attached to the metal vehicle chassis. Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches any suitable body panel to the vehicle chassis, such that the fastener clip improves reliability both in the short term and in the long term, while further improving vehicle safety and quality.

The fastener clip dampens vibrations and thus eliminates or substantially reduces buzz, squeak and rattles. The fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip and carrier may be made of anti-corrosive material such as plastic or treated metal to provide long reliable service life.

Figure 1:
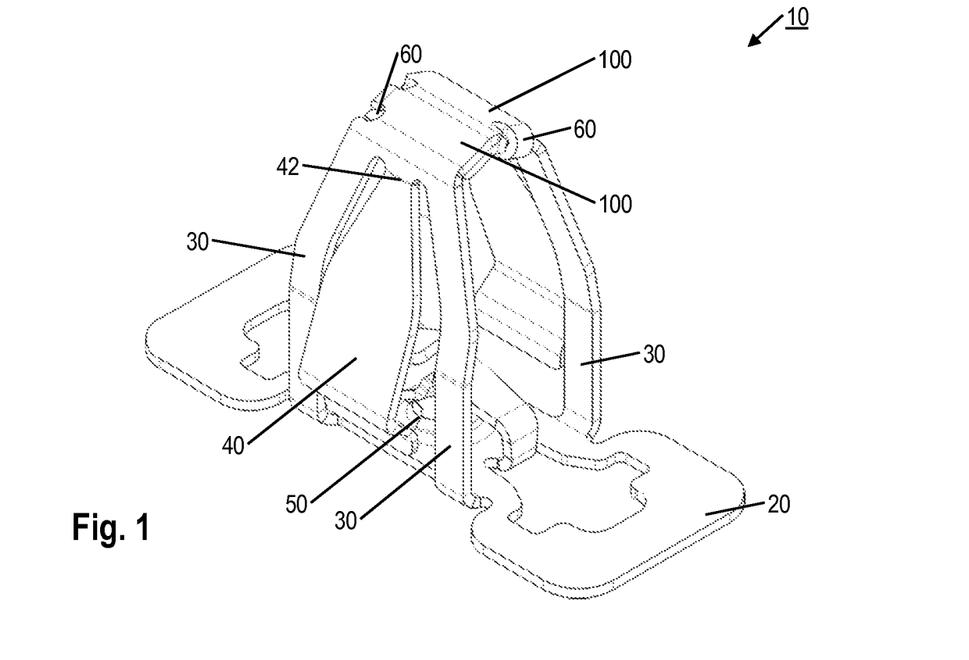
FIG. 1 is a perspective view of a fastener clip according to one embodiment.

FIG. 1 is a perspective view of a fastener clip 10 according to one embodiment. The fastener clip 10 includes a base plate 20 and a first and second pair of laterally offset legs 30 extending from the base plate 20. At least one first wing 40 extends from the first pair of laterally offset legs 30. The at least one first wing 40 has an engagement region 50. At least one second wing 40 extends from the second pair of laterally offset legs 30. The at least one first wing 40 extends from (are attached to) the first pair of laterally offset legs 30 near the joined portion 100 opposite from the base plate 20. Similarly, the at least one second wing 40 extends from (are attached to) the second pair of laterally offset legs 30 near the joined portions 100 opposite from the base plate 20.

A first joined portion 100 extends from the first pair of the legs 30 and a second joined portion 100 extends from the second pair of the legs 30. The first and second joined portions 100 extend one over and the other under the other, overlapping. One or more tabs formed as part of one or both of joined portions 100 are folded over against the other joined portion 100 to keep the two joined portions 100 securely locked together. In some embodiments, the two joined portions may be touching creating friction between them. The friction contributes to the locking of the two joined portions together.

In some embodiments, the joined portions may also have one or more tab-receiving channels corresponding to the one or more tab-receiving channels. The one or more tab-receiving channels are configured to receive the one or more folded over locking tabs, further.

In some embodiments, the first joined portion and the second joined portion are bent at a certain angle to form an overlapping rooftop with each other, again further contributing to the locking of the two joined portions together. In some embodiments, the connection between the two joined portion resists rotation and flex in all directions.

Although reference number 30 refers to both pairs of legs and reference number 40 refers to wings 40 on both pairs of legs 30, it is understood that the at least one first wing 40 corresponds to the first pair of legs 30 and the at least one second wing 40 corresponds to the second pair of legs 30. Although the fastener clip 10 is shown in FIGS. 1-12 with four legs 30 and two wings 40, any suitable number of legs 30 and wings 40 may be used. For example, two legs 30 and two wings 40 may be used, two legs 30 and four wings 40 may be used, three legs 30, four legs 30 an so forth may be used. According to one embodiment, the legs 30 and arms 30 may have any suitable shape, such as for example, at least one of: the legs and the arms, is tapered, straight, curved or any suitable shape.

The wings 40 have a size, such as a width, length, thickness and a pivot point 42 to provide very high extraction force levels while the insertion force level is relatively very low. For example, the pivot point 42 may be weakened by scoring, stamping, bending or cutting, or any suitable means on wing 40 to ensure that the wings 40 spring inward as required so that the insertion force is low relative to the extraction force. Since the wings 40 are in compression during extraction, the weakened pivot point 42 does not significantly weaken the extraction force yet the insertion force is reduced. Additionally, the width of the wing 40 may be increased (FIGS. 6-12) to further increase the strength of the wing and thus increase the extraction force, as well as increase the size of the engagement region. Alternatively, the width of the wing may be decreased, or the wings may have different widths and engagement regions 50 to achieve any desired insertion force, extraction force or ratio.

Figure 2:
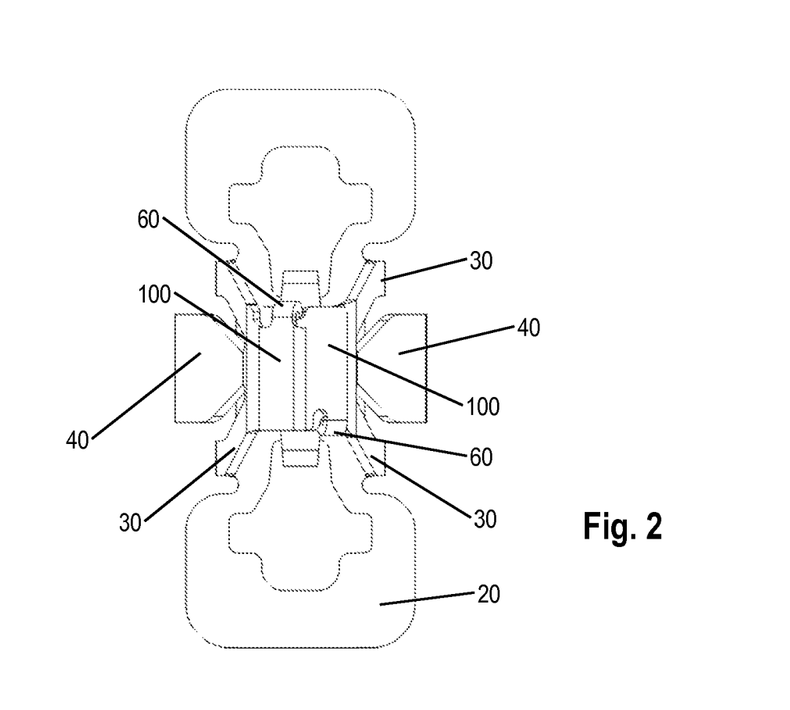
FIG. 2 is a top view of the fastener clip according to another embodiment.

FIG. 2 is a top view of the fastener clip 10 according to another embodiment. First locking tabs 60 are on the first pair of laterally offset legs 30 extending from joined portion 100 at an end opposed the base plate 20. Similarly, second locking tabs 60 are on the second pair of laterally offset legs 30 extending from joined portion 100 at an end opposed the base plate 20. For example, the locking tabs 60 extend from a joined portion 100 and are folded over against the other joined portion 100 to prevent or reduce movement between the pair of legs 30 and strengthen the fastener clip 10 to improve engagement.

Figure 3:
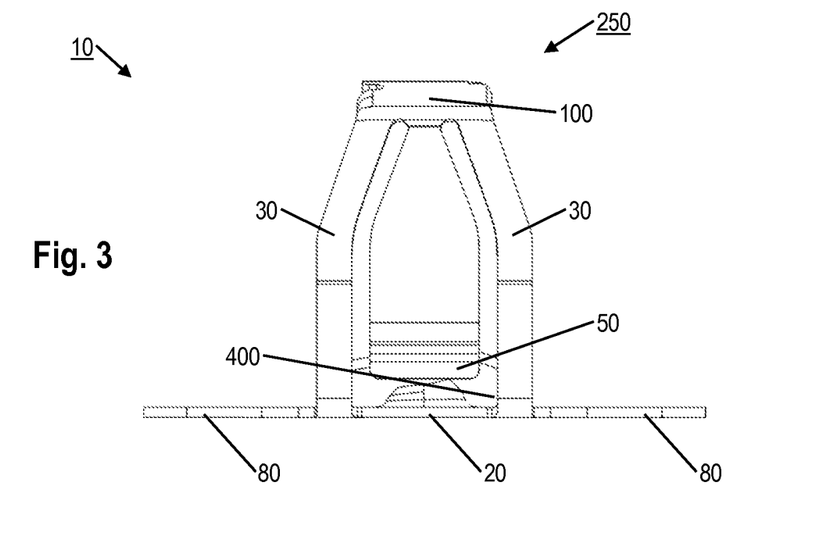
FIG. 3 is a side view of the fastener clip according to one embodiment.

FIG. 3 is a side view of the fastener clip 10 according to one embodiment. According to this embodiment, the fastener clip 10 comprises end brackets 80 at opposite ends of the base plate.

Figure 4:
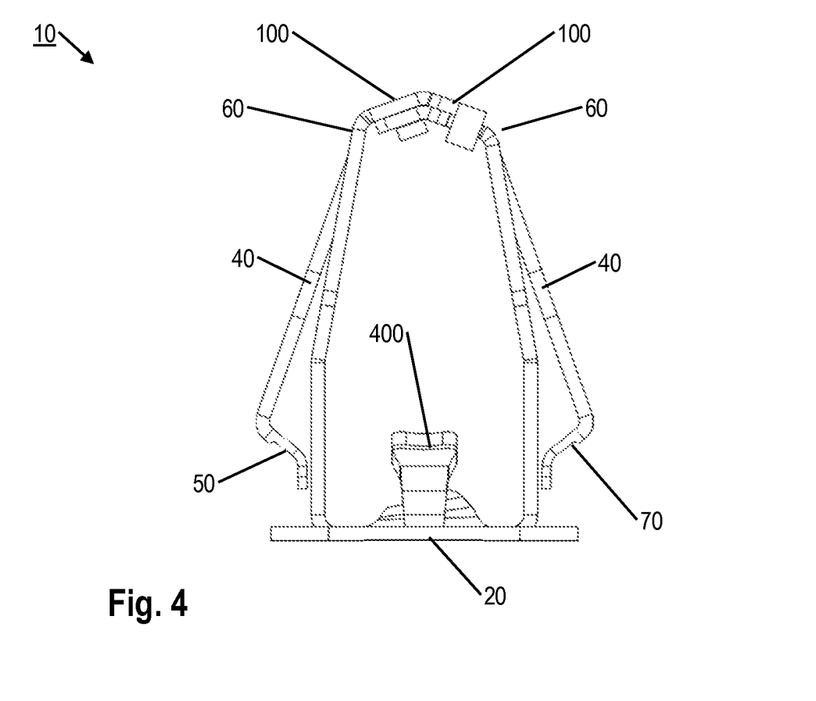
FIG. 4 is another side view of the fastener clip shown in FIG. 3 rotated 90 degrees.

FIG. 4 is another side view of the fastener clip 10 shown in FIG. 3 rotated 90 degrees. At least two threading projections 400 protrude from the base plate 20, such that the at least two threading projections 400 point to each other to create a frictional opening 410. According to one embodiment, the fastener clip 10 further includes a side wing to engage a narrow edge of the slot wherein the optional engagement regions 50 on the first and second wings 40 engage a relatively wide edge of the slot.

Figure 5:
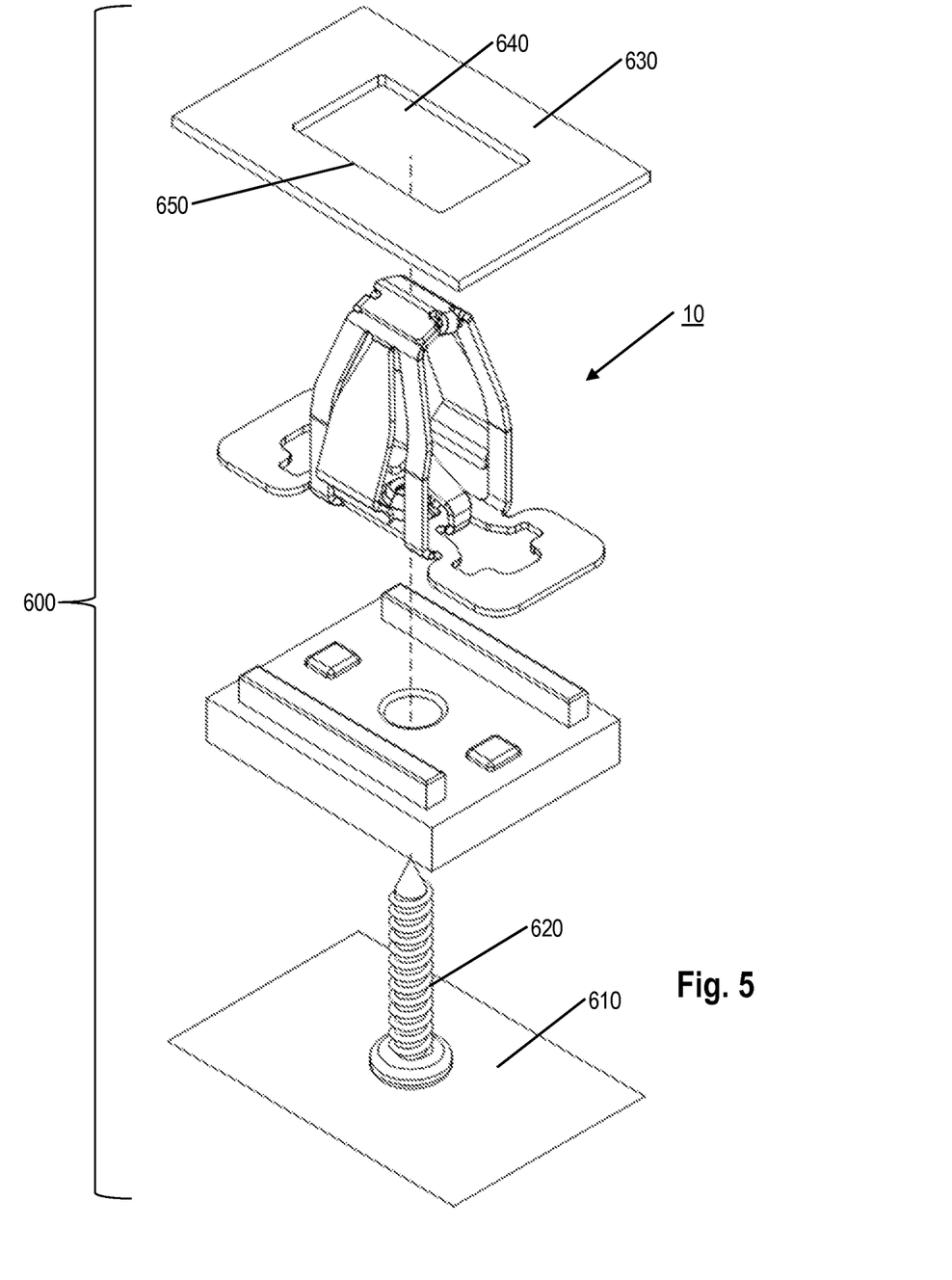
FIG. 5 a perspective view of a body panel assembly according to one embodiment.
Figure 6:
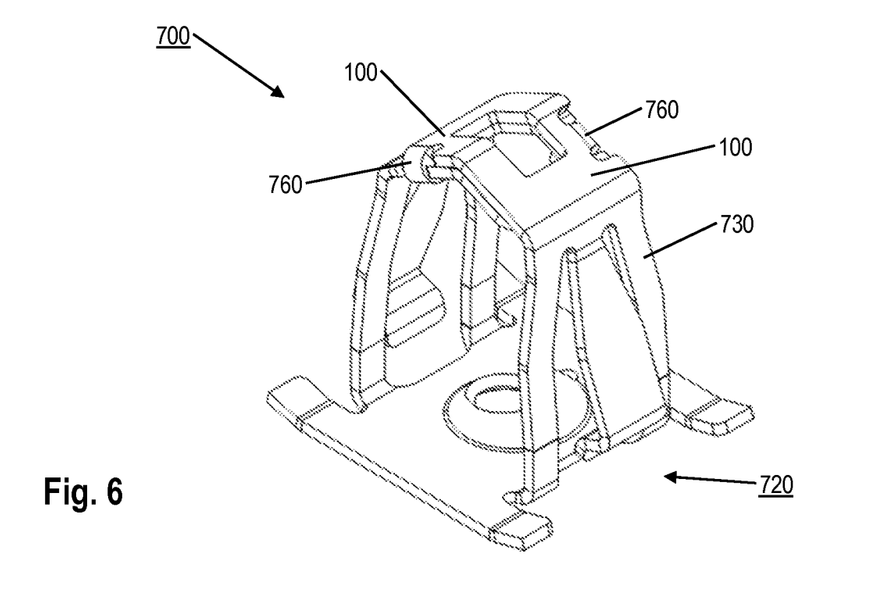
FIG. 6 is a perspective view of a fastener clip in accordance with another embodiment.
Figure 7:
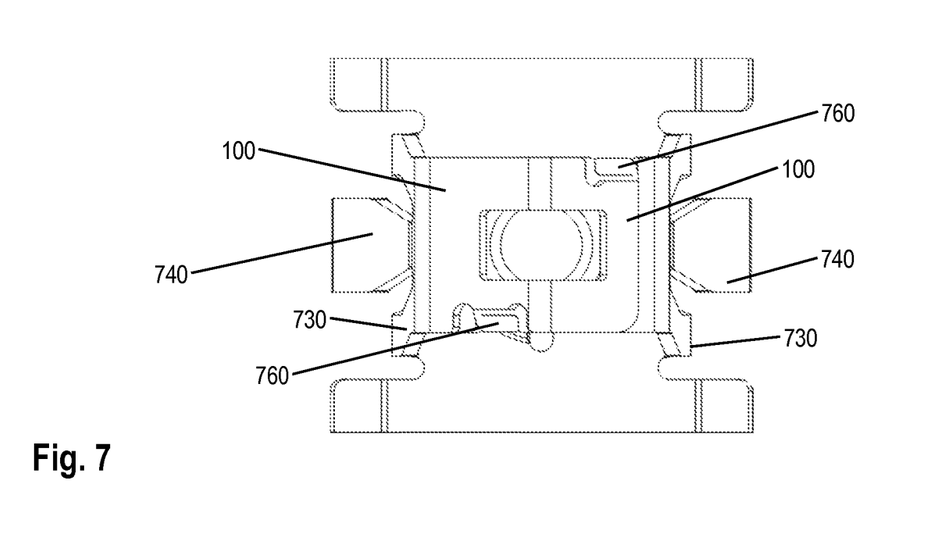
FIG. 7 is a top view of the fastener shown in FIG. 6.
Figure 8:
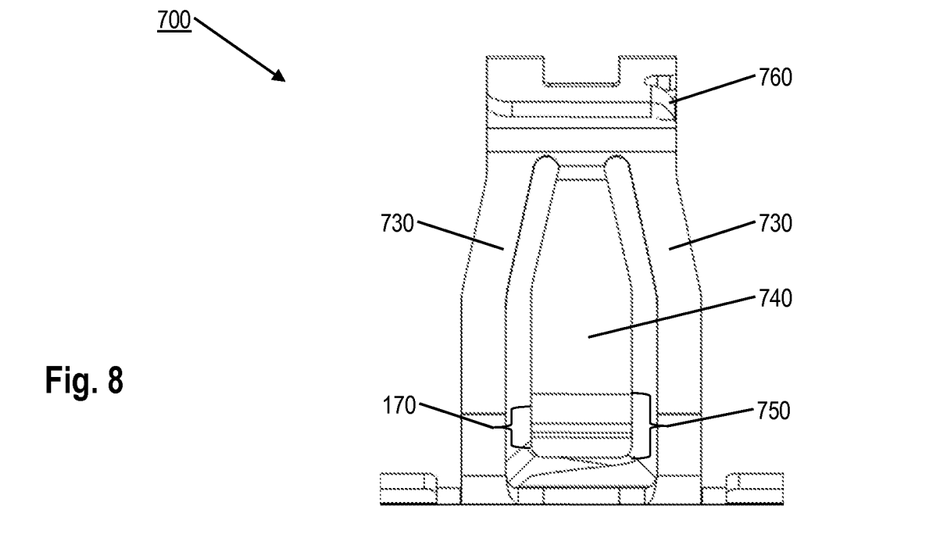
FIG. 8 is a side view of a fastener clip in accordance with an exemplary embodiment.
Figure 9:
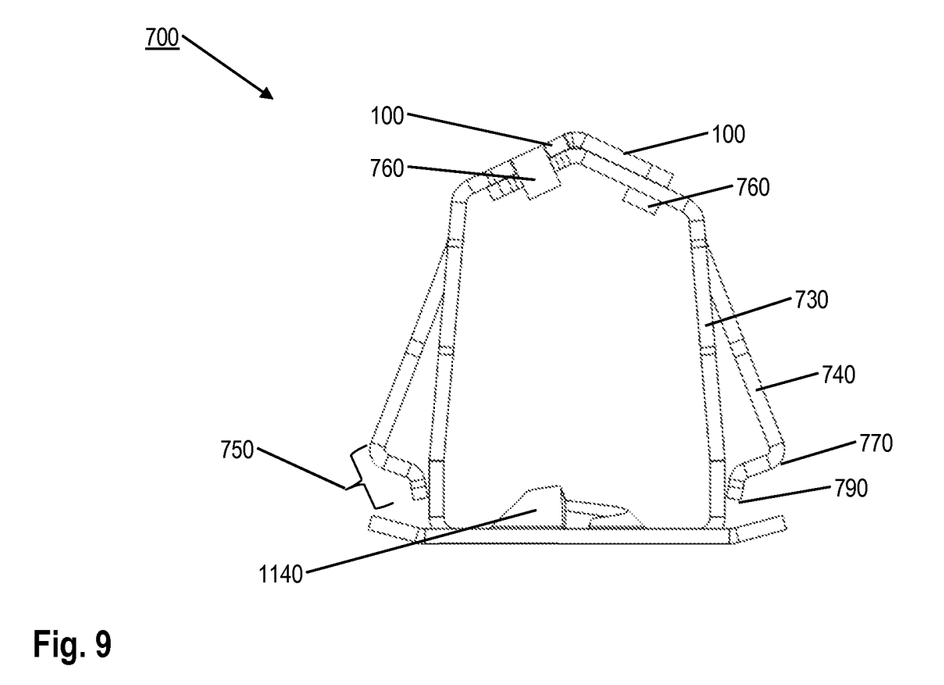
FIG. 9 is another side view of the fastener clip shown in FIG. 8 rotated 90 degrees.

FIG. 5 is a perspective view of a body panel assembly 600 according to one embodiment. The body panel assembly 600 comprises a body panel 610, such as a headliner and visor mounting assembly having a mounting member and fastener such as a screw, bolt, rivet or any suitable fastener 620 to engage the fastener clip 10. The fastener clip 10 is operatively inserted into a slot 640 defined in a first engagement structure 630, such as a vehicle chassis or frame. The fastener clip 10 optionally adapts to different frame 630 thicknesses and curvatures such that a distance between the engagement regions 50 and the base plate 20 is operative to vary continuously according to a slot 640 thicknesses.

According to one embodiment, the fastener clip 10 is made of: steel, tin aluminum, magnesium, copper, carbon fiber or any suitable metal or alloy. According to another embodiment, the fastener clip 10 is made of: plastic, acetal, polyacetal, polyoxymethylene, nylon, fiberglass, Acrylonitrile butadiene styrene (ABS), and/or carbon fiber, however any suitable material may be used in any combination such as steel, tin and/or any suitable metal. According to an alternative embodiment, a coating is applied on the fastener clip made of at least one of: nickel plating, zinc plating, rubber, plastisol, plastic, acetal, polyacetal, polyoxymethylene, nylon, fiberglass and/or carbon fiber to suitably provide corrosion resistance and to reduce rattling.

The body panel 610, such as a visor bracket and headliner, may be constructed from plastic or from any suitable material such as wood, steel, aluminum, magnesium, wood, plastic, fiber glass, carbon fiber or any suitable material.

FIGS. 6-10 are various views of a fastener clip 700 in accordance with another embodiment. Although this embodiment is in general similar to the clips shown in FIGS. 1-5, different reference numbers are provided although the previous relevant descriptions apply. The fastener clip 700 includes a base plate 720 and a first and second pair of laterally offset legs 730 extending from the base plate 720. At least one first wing 740 extends from the first pair of laterally offset legs 730. The at least one first and second wing 740 has an engagement region 750 and depressed portion 770. At least one second wing 740 extends from the second pair of laterally offset legs 730.

A first joined portion 100 extends from the first pair of the legs 730 and a second joined portion 100 extends from the second pair of the legs 730. The first and second joined portions 100 extend one over and the other under the other, overlapping. One or more tabs formed as part of one or both of joined portions 100 are folded over against the other joined portions 100 to keep the two joined portions 100 securely locked together. In some embodiments, the two joined portions may be touching creating friction between them. The friction contributes to the locking of the two joined portions together.

In some embodiments, overlapping aligned slots may be formed in both the joined portions 100. In some embodiments, removing some material from both sides for the holes makes the fastener more pliable, and thus easier to remove and insert. In other embodiments, extrusions and/or tabs may be formed at the perimeter of one or more of the holes to form a channel to guide the other side and have two to form a more secure lock.

Figure 10:
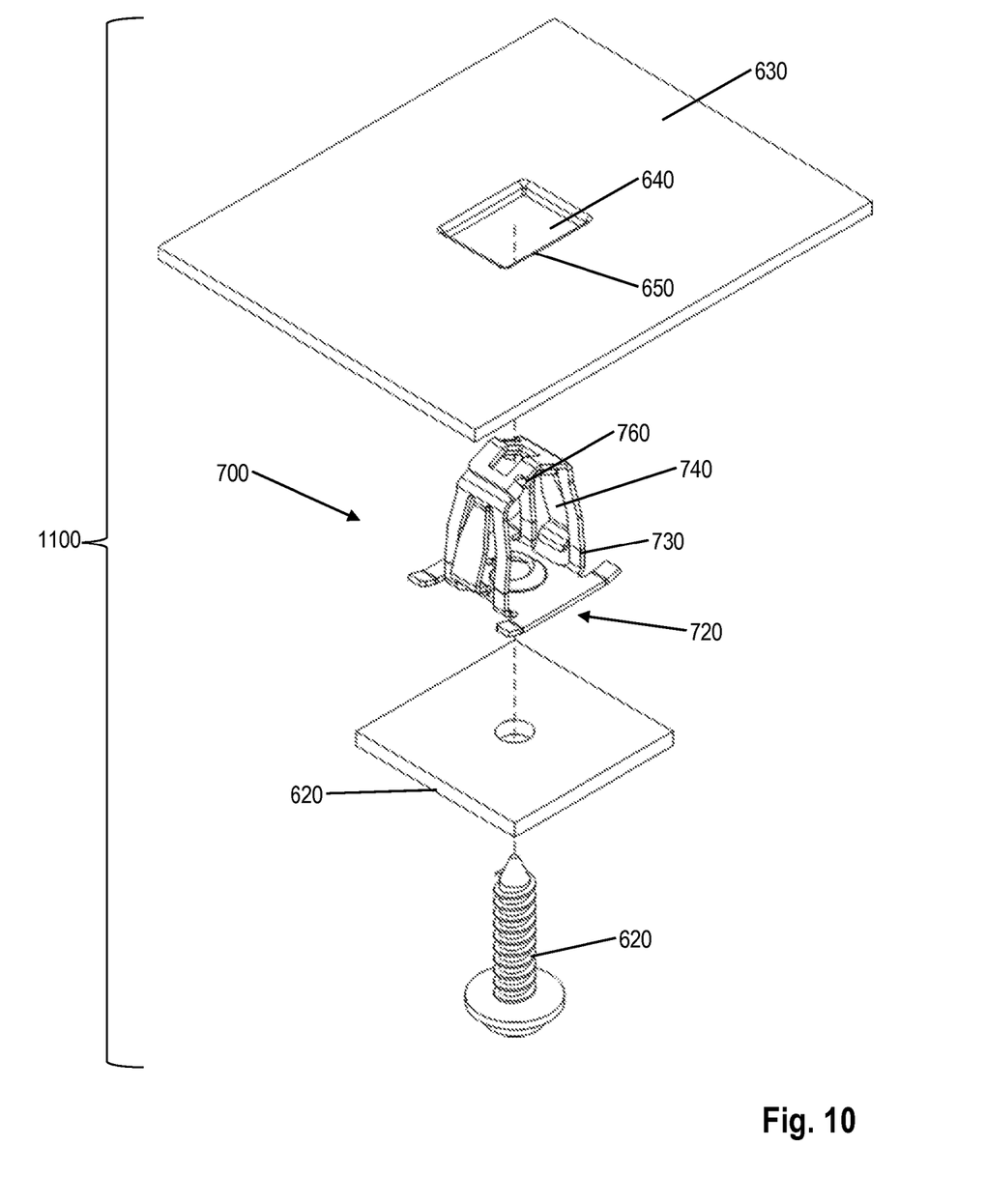
FIG. 10 is an exploded view of a body panel assembly according to one embodiment.

FIG. 10 is a perspective view of a body panel assembly 1100 according to one embodiment. The body panel assembly 1100 comprises a body panel 610, such as a headliner and visor mounting assembly having a fastener such as a screw, bolt, rivet or any suitable fastener 620 to engage threading projections 1140 on the fastener clip 10. The fastener clip 700 is operatively inserted into a slot 640 defined in a first engagement structure 630, such as a vehicle chassis or frame.

Figure 11:
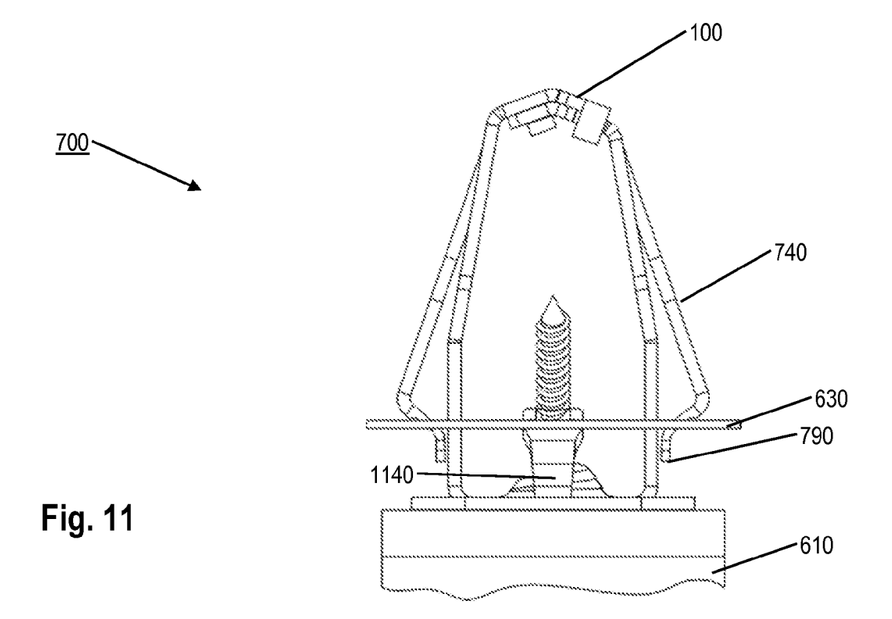
FIG. 11 is a side view of the fastener clip prior affixed to a frame.

FIG. 11 is a side view of the fastener clip 700 prior to being affixed to a first engagement structure 630. The joined portion 100 may provide a guide for inserting the fastener clip 700 into the slot 640 of the first engagement structure 630, such as a roof or vehicle chassis, during assembly.

Figure 12:
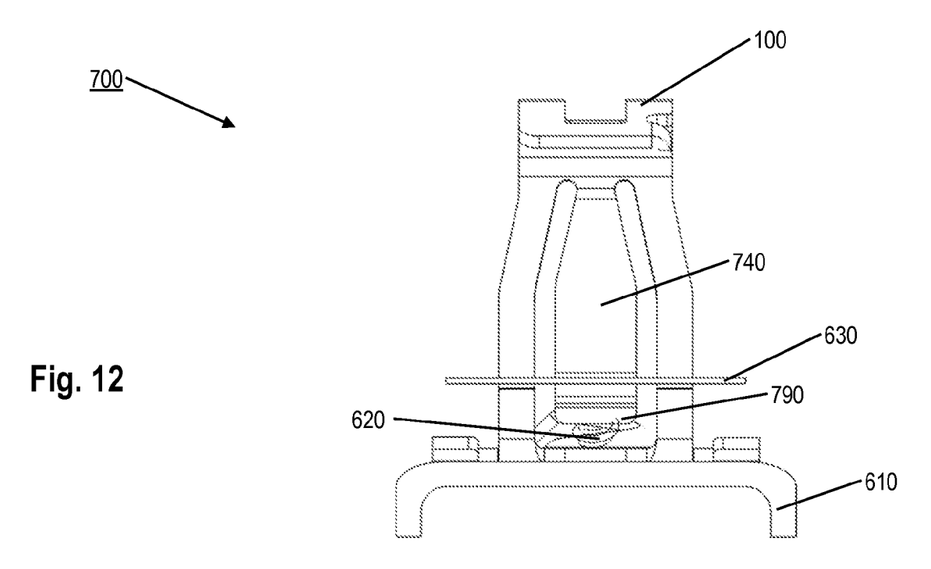
FIG. 12 is a side view of the fastener clip affixed to a frame as shown in FIG. 11 rotated 90 degrees in accordance with an exemplary embodiment.

FIG. 12 is a side view of the fastener clip 700 affixed to an engagement structure 630 as shown in FIG. 11 rotated 90 degrees in accordance with an exemplary embodiment. The fastener clip 700 optionally adapts to different frame 630 thicknesses such that a distance between the engagement regions 750 and the base plate 720 is operative to vary continuously according to a slot 640 thicknesses.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip comprising:
   a base plate;
   a first pair of laterally offset legs extending from the base plate;
   at least one first wing extending from the first pair of laterally offset legs, the at least one first wing having an engagement region;
   a second pair of laterally offset legs extending from the base plate;
   at least one second wing extending from the second pair of laterally offset legs, the at least one second wing having an engagement region, wherein the engagement regions include a depressed portion operable to adapt to variations or movement of a slot;
   a first joined portion extending from the first pair of laterally offset legs at an end opposed to the base plate and toward the second pair of laterally offset legs;
   a second joined portion extending from the second pair of laterally offset legs at an end opposed to the base plate and toward the first pair of laterally offset legs, wherein the first joined portion and the second joined portion extend over and under each other, overlapping each other;
   one or more locking tabs extending sideways from one of the joined portions folded over against a side of the overlapping other joined portion, substantially locking the first and second joined portions to each other.

2. The fastener clip of claim 1, wherein the first joined portion and the second joined portion both comprise an aligned slot.

3. The fastener clip of claim 1, further comprising one or more tab-receiving channels in one of the joined portions, wherein the one or more tab-receiving channels correspond to the one or more locking tabs, wherein the one or more tab-receiving channels are configured to receive the one or more folded over locking tabs.

4. The fastener clip of claim 1, wherein the first joined portion and the second joined portion are bent at a certain angle to form an overlapping rooftop with each other.

5. The fastener clip of claim 1, wherein the depressed portion further includes at least one of: an abrupt edge, a gradual angled edge, a curve, a single angled edge, a discrete multi-angled edge, and a pointed edge.

6. The fastener clip of claim 1, wherein the depressed portion is formed by at least one of: stamping, cutting, molding, and etching.

7. The fastener clip of claim 1, wherein the depressed portion includes at least one of: a protrusion, prong, edge, rounded, bulbous, stepped, angled, dimple, and depression.

8. The fastener clip of claim 1, further comprising at least two threading projections protruding from the base plate, such that the at least two threading projections point to each other to create a frictional opening.

9. The fastener clip of claim 1, wherein an engagement force is less than an extraction force.

10. A fastener assembly comprising:
   a body panel comprising a carrier assembly;
   a fastener clip comprising:
      a base plate coupled to the carrier assembly;
      a first pair of laterally offset legs extending from the base plate;
      at least one first wing extending from the first pair of laterally offset legs, the at least one first wing having an engagement region;
      a second pair of laterally offset legs extending from the base plate;
      at least one second wing extending from the second pair of laterally offset legs, the at least one second wing having an engagement region, such that the engagement regions include a depressed portion operable to adapt to variations or movement of a slot;
      a first joined portion extending from the first pair of laterally offset legs at an end opposed to the base plate and toward the second pair of laterally offset legs;
      a second joined portion extending from the second pair of laterally offset legs at an end opposed to the base plate and toward the first pair of laterally offset legs, wherein the first joined portion and the second joined portion extend over and under each other, overlapping each other;

one or more locking tabs extending sideways from one of the joined portions folded over against a side of the overlapping other joined portion, substantially locking the first and second joined portions to each other.

11. The fastener assembly of claim 10, wherein the first joined portion and the second joined portion both comprise an aligned slot.

12. The fastener assembly of claim 10, further comprising one or more tab-receiving channels in one of the joined portions, wherein the one or more tab-receiving channels correspond to the one or more locking tabs, wherein the one or more tab-receiving channels are configured to receive the one or more folded over locking tabs.

13. The fastener assembly of claim 10, wherein the first joined portion and the second joined portion are bent at a certain angle to form an overlapping rooftop with each other.

14. The fastener assembly of claim 10, wherein the depressed portion further includes at least one of: an abrupt edge, a gradual angled edge, a curve, a single angled edge, a discrete multi-angled edge and a pointed edge.

15. The fastener assembly of claim 10, further comprising at least two threading projections protruding from the base plate, such that the at least two threading projections point to each other to create a frictional opening and to engage a fastener also engaged to the mounting member.

16. The fastener assembly of claim 10, wherein an engagement force is less than an extraction force.

17. A vehicle comprising:
a vehicle chassis having a slot;
a body panel comprising a carrier assembly;
a fastener clip comprising:
  a base plate coupled to the carrier assembly;
  a first pair of laterally offset legs extending from the base plate;
  at least one first wing extending from the first pair of laterally offset legs, the at least one first wing having an engagement region;
  a second pair of laterally offset legs extending from the base plate;
  at least one second wing extending from the second pair of laterally offset legs, the at least one second wing having an engagement region, such that the engagement regions include a depressed portion operable to adapt to variations or movement of the slot;
  a first joined portion extending from the first pair of laterally offset legs at an end opposed to the base plate and toward the second pair of laterally offset legs;
  a second joined portion extending from the second pair of laterally offset legs at an end opposed to the base plate and toward the first pair of laterally offset legs, wherein the first joined portion and the second joined portion extend over and under each other, overlapping each other;
  one or more locking tabs extending sideways from one of the joined portions folded over against a side of the overlapping other joined portion, substantially locking the first and second joined portions to each other.

18. The vehicle of claim 17, wherein the first joined portion and the second joined portion both comprise an aligned slot.

19. The vehicle of claim 17, further comprising one or more tab-receiving channels in one of the joined portions, wherein the one or more tab-receiving channels correspond to the one or more locking tabs, wherein the one or more tab-receiving channels are configured to receive the one or more folded over locking tabs.

20. The vehicle of claim 17, wherein the first joined portion and the second joined portion are bent at a certain angle to form an overlapping rooftop with each other.

21. The vehicle of claim 17, wherein the depressed portion further includes at least one of: an abrupt edge, a gradual angled edge, a curve, a single angled edge, a discrete multi-angled edge and a pointed edge.

* * * * *